Sept. 13, 1949.                    C. C. KING                    2,482,004
                            CANOPY OPERATING MECHANISM
Filed Sept. 27, 1944                                          3 Sheets-Sheet 2
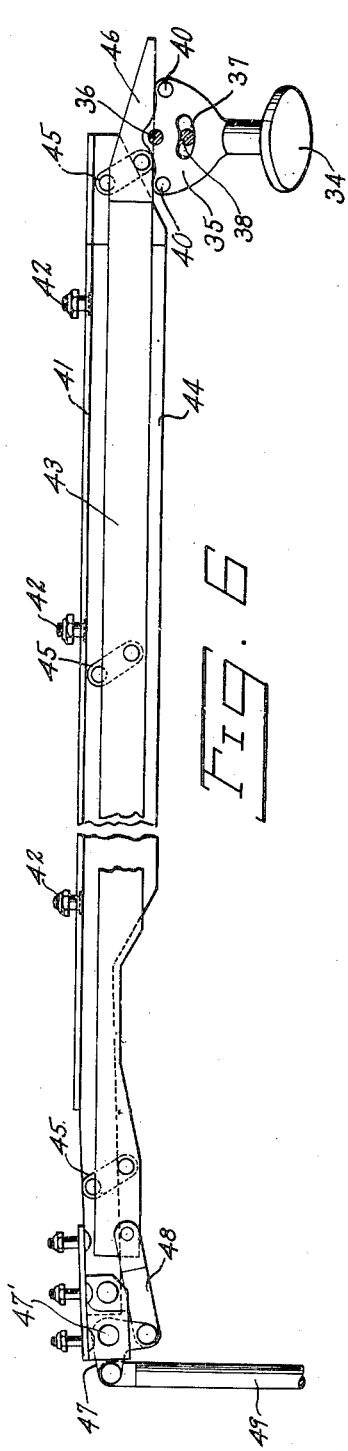
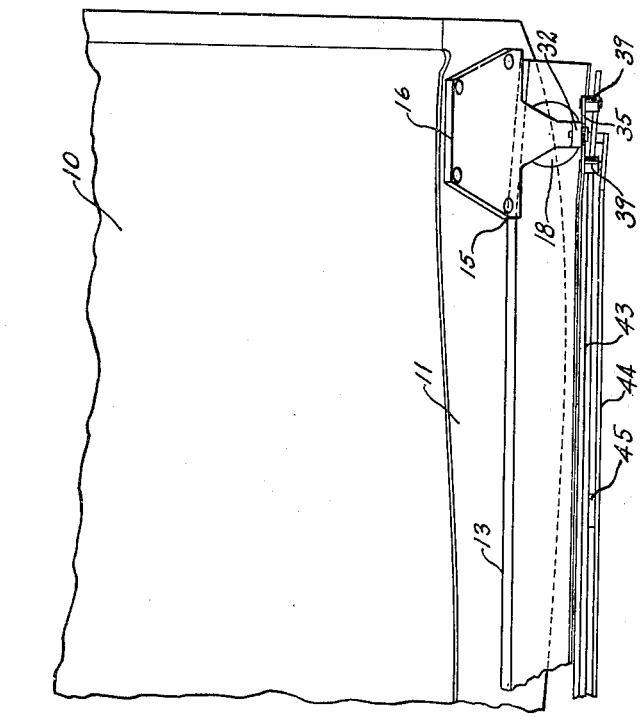
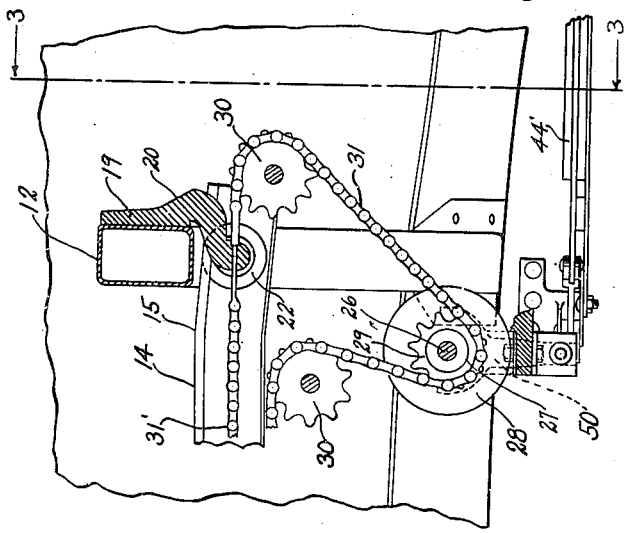
INVENTOR.
Carl C. King
BY Charles S. Wilson
ATTORNEY.

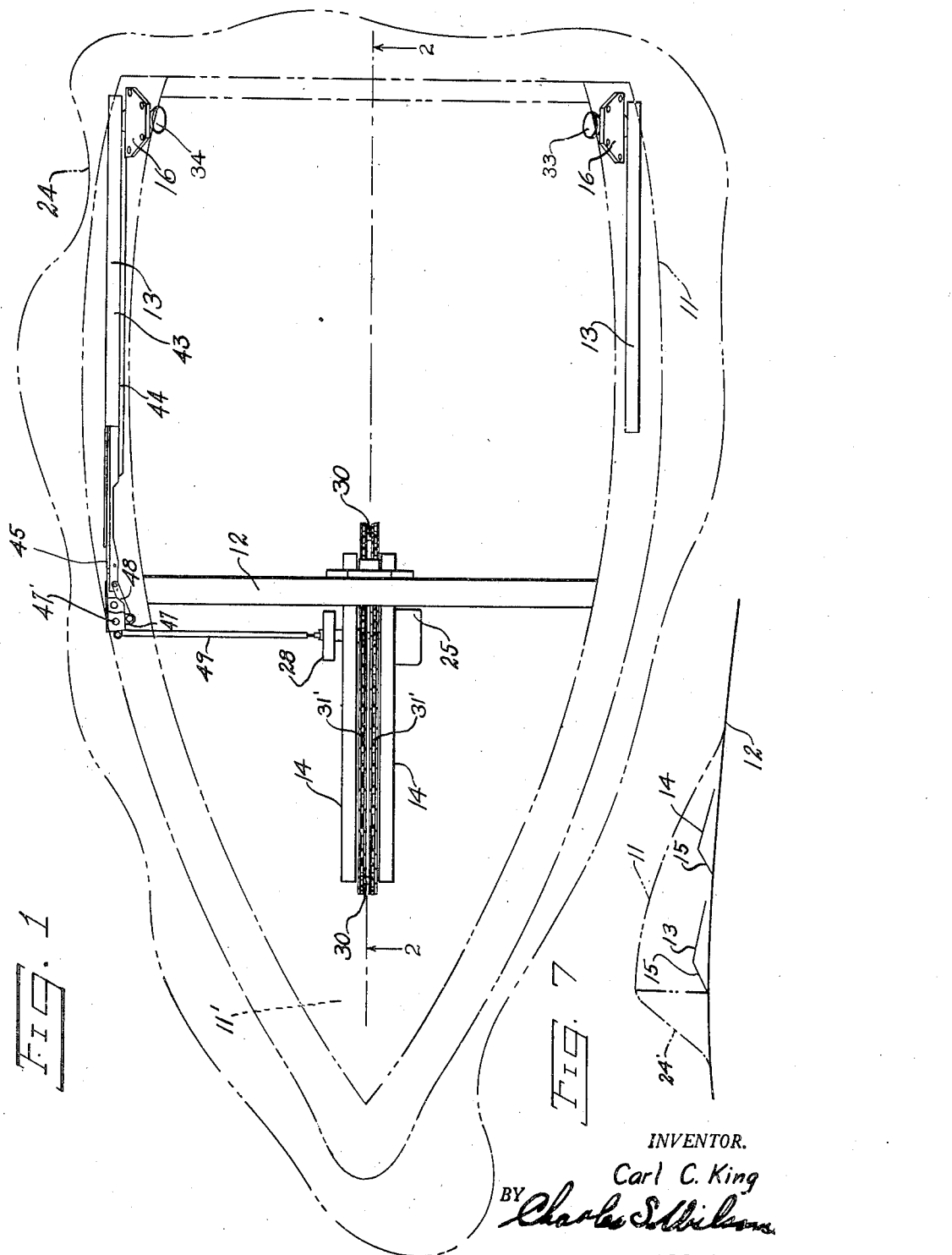

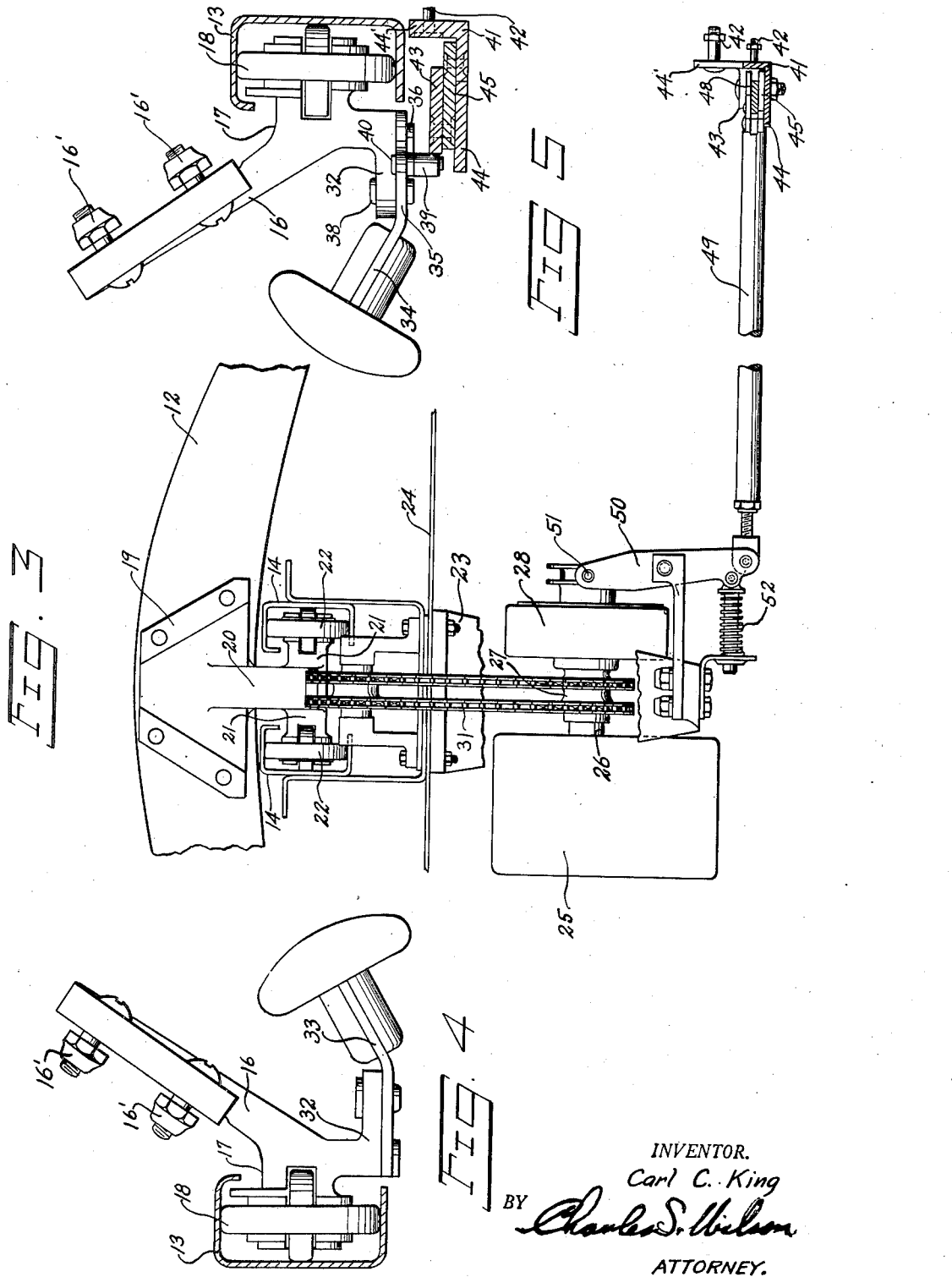

Patented Sept. 13, 1949

2,482,004

UNITED STATES PATENT OFFICE 2,482,004

CANOPY OPERATING MECHANISM

Carl C. King, Massapequa, N. Y., assignor to Republic Aviation Corporation, Farmingdale, N. Y., a corporation of Delaware Application September 27, 1944, Serial No. 555,970

16 Claims. (Cl. 244—121)

1

This invention relates to mechanisms for the operation of aircraft canopies of the type which slide or reciprocate relative to the fuselage to and from closed position and proposes a construction whereby the canopy may be so reciprocated either mechanically or manually and wherein each mode and means of operation is fully effective independently of the other.

Among its other objects the present invention contemplates a normally effective mechanism for operating the canopy mechanically which is automatically rendered ineffective upon the initiation of manual operation and is restored automatically to normal operative effectiveness upon completion of the manual operation.

The instant invention not only has in view the sliding or reciprocable movement of the canopy longitudinally of the fuselage but also a movement, or series of movements thereof transversely of the fuselage, among other ends to assist in establishing the free longitudinal movement of the canopy, to reduce friction between the canopy and the fuselage, and to insure terminal seating of the canopy and proposes to accomplish these relative movements while maintaining the canopy substantially within the wake of the windshield regardless of the position of the canopy.

With the above and other objects in view, as will be apparent, this invention consists in the construction, combination and arrangement of parts all as hereinafter more fully described, claimed and illustrated in the accompanying drawings, wherein:

Fig. 1 is a plan view showing in phantom lines one type of reciprocating canopy and illustrating in full lines the present operating mechanism in conjunction therewith:

Fig. 2 is a fragmentary longitudinal section taken along line 2—2 of Fig. 1, with parts broken away, illustrating the present invention and particularly the control or connections for automatically rendering the mechanical operating means ineffective upon the initiation of manual operation:

Fig. 3 is a fragmentary vertical section taken along line 3—3 of Fig. 2 to illustrate the mechanical operating means for the canopy in conjunction with the clutch and its coacting control which renders the mechanical operating means ineffective upon the initiation of manual operation:

Fig. 4 is an elevation of the roller bracket and handle supporting one side of the canopy and including a fixed handle for the manual operation thereof, the cooperating track being shown in transverse section:

Fig. 5 is a similar view of the opposed roller bracket supporting the opposite side of the canopy and which incorporates a pivoted handle and cooperating control for the clutch by which the mechanical operating mechanism is rendered ineffective upon the initiation of manual operation, the control cooperating with the handle and the coacting track being shown in transverse section:

Fig. 6 is a plan view of the pivoted handle shown in Fig. 5 (the roller bracket illustrated in Fig. 5 being omitted for clarity of illustration) and of the connections under the control of this handle by which the clutch (Figs. 2 and 3) is manipulated to render the mechanical operating means ineffective upon the initiation of manual operation: and Fig. 7 is a schematic side elevation showing the windshield and the canopy in phantom lines and, in full lines, the tracks on which the canopy operates in its movement relative to the fuselage, the outline of the tracks being exaggerated to more clearly illustrate the relative angularity of portions or sections of each track and the relation of each track to the fuselage.

The present invention being designed for either the mechanical or the manual reciprocation of a slidable aircraft canopy is normally conditioned for the mechanical operation of the canopy and includes means for rendering normal mechanical operating means ineffective upon the initiation of manual operation.

While the instant invention is adaptable to all types of sliding or reciprocating canopies it will be here shown and described in conjunction with a canopy of the "bubble" type which has a relatively wide forward end and tapers or curves toward the aft end where it terminates in an approximate point disposed above and slidable along the plane of the longitudinal axis of the fuselage.

Mechanical means is proposed for the normal reciprocation of the canopy from and to its open position, which includes a motor connected to the canopy near its aft end and under control of any suitable means situated within the cockpit whereby, for example, the pilot by merely pressing one or the other of two buttons may cause the canopy to be moved in an aft direction or in a forward direction. This mechanism for mechanically operating the canopy is the normally and usually effective operating mechanism, but in the event it fails or if for any other reason it is not or can not be used, manual means is provided whereby the pilot may grasp a handle upon each side of the forward end of the canopy and manually slide or reciprocate the canopy in either direction. Such movement of the canopy would be materially impeded by the mechanical operating mechanism including the motor, if not altogether impossible, and therefore means for controlling the effectiveness of the motor and its associated operating mechanisms from one or both of the handles carried by the canopy is provided. Thus, regardless of the position of the canopy or the proposed direction of its movement the initiation of movement by manually grasping and pulling on the handles as aforesaid, renders the mechanical operating mechanism wholly ineffective, either to operate the canopy or to impede its manual operation until the latter is terminated, whereupon the mechanical operating feature of this invention is automatically restored to its normal effectiveness.

Reference being had more particularly to the drawings, 10 designates a transparent aircraft canopy of the "bubble" type provided with an apron or frame piece 11 at its edges. The shape of the canopy here shown for illustrative purposes, is such that it is relatively wide at its forward end and to a point substantially midway of its length where it begins to taper gradually to an approximate point 11' at its aft end. When the canopy 10 is closed, that is, in its full forward position its forward end abuts the windshield 24' and its apron or frame 11 rests snugly or flush against the fuselage 24. This contact between the fuselage and the apron or frame piece 11 would present an appreciable frictional drag or impediment to any movement of the canopy which is eliminated as will be hereinafter more fully described. At approximately the point where the canopy 10 and its apron or frame 11 begin the most pronounced taper toward its aft end 11', a yoke 12 is interposed between the opposed sides of the apron or frame piece 11 and arches upwardly in spanning the space defined by the canopy and the sides of the frame piece or apron. The operating mechanism by which the canopy is mechanically moved in an aftward or forward direction is connected to the canopy by and through the yoke 12 so that the power mechanically moving the canopy in either direction is applied to the canopy at a point substantially midway of its length and centrally of its width.

Fixed to the fuselage 24 upon each side of the cockpit is a track 13 while immediately aft of the cockpit is a pair of spaced opposed tracks 14, fixed to the outer surface of the top of the fuselage upon each side of a vertical plane passing through the longitudinal axis of the fuselage. These tracks, viz: tracks 13 attached to the longerons on opposed sides of the cockpit and track or tracks 14 attached to the top of the fuselage immediately aft of the cockpit, which in effect combine to comprise a single track, constitute the means by which the canopy 10 is mounted and supported for reciprocation on and relative to the fuselage. The forward terminal portion 15 of each of these tracks 13—14 slopes downwardly, to seat the edge portion of the apron or frame 11 of the canopy 10 upon and against the fuselage 24 when the latter is completely forward and abutting the windshield.

It is to be observed from Fig. 7 that those portions of the tracks 13—14 positioned aft of the sloping forward terminal portions 15 of the tracks do not lie in a single horizontal plane or parallel to the skin of the fuselage, but on the contrary slope in an aftward direction toward the fuselage and terminate in a common plane somewhat above the common plane of the forward extremities of the tracks. These several angles of inclination are relatively small as is also the difference in elevation between the forward and aft extremities of each track and therefore in Fig. 7 the tracks have been schematically enlarged and exaggerated to illustrate the proportions of the several angles and the relative positions of the terminals of each track. Thus in its movement aftward the canopy 10 moves away from the fuselage 24 up the relatively abrupt forward terminal portions 15 of the tracks and then moves along the remainder of the tracks gradually approaching but not quite contacting the fuselage 24 at the aft extremities of the tracks. By this coaction between the canopy 10 and the tracks 13—14 all frictional resistance arising out of possible contact between the frame or apron 11 and the fuselage 24 is eliminated, the movement of the canopy 10 in an aftward direction, regardless of the means employed to move it, is facilitated and the canopy at all times is kept substantially within the wake of the windshield.

A roller bracket plate 16 is fixed to the forward extremity of each side of the frame piece or apron 11 of the canopy 10 by any suitable means, e. g. the bolts 16' and is provided with an outwardly extending, horizontal journal 17 upon which a roller assembly 18 is mounted. This roller assembly 18 rests within and operates upon the coacting track 13 secured to the adjacent longeron of the fuselage. A somewhat similar roller bracket plate 19 is centrally secured to the yoke 12 and has a depending extension 20 which terminates between the tracks 14 carried by the fuselage 24 immediately aft of the cockpit, where it is provided with transversely disposed journals 21 projecting upon each side thereof, each to carry a roller assembly 22. The roller assemblies 22 upon the opposite sides of the extension 20 are situated below the yoke 12 and operate in or upon the opposed tracks 14. Thus the canopy 10 carries a series of roller assemblies 18—22 to coact with the tracks 13—14 thereby permitting the free movement of the canopy longitudinally of the fuselage to close or roof the cockpit of the fuselage or to open it depending upon the direction of reciprocation of the canopy 10.

It will be noted that as the rollers 18—22 in their movement on the tracks 13—14 operate in one direction on the downwardly sloping end portions 15 of the tracks 13—14 the canopy 10 is bodily lifted or elevated to create a relatively small separation between the edge portion of the frame piece or apron 11 and the fuselage 24. The reverse movement of the rollers 18—22 on the tracks 13—14 upon reaching and operating on the terminal portions 15 lowers the canopy toward the fuselage 24 so that when it abuts the windshield 24' the edge of the apron or frame 11 contact the fuselage. This bodily movement of the canopy 10 toward or away from the fuselage, due to the travel of the rollers 18—22 downwardly or upwardly on the inclined portions 15 of the tracks 13—14 overcomes and eliminates any frictional impedance to the movement of the canopy and yet insures a complete closure when the canopy is in its forward position.

For the purpose of mechanically reciprocating the canopy 10 on the tracks 13—14, a fixed hanger 23 is suspended internally of the fuselage 24 adjacent the forward end of the tracks 14 and supports a reversible electric motor 25. The shaft 26 of this motor drives a sleeve or sprocket hub 27 through a standard clutch mechanism 28 so that the continued rotation of the motor can be rendered ineffective for the rotation of the sleeve by and through the regulation or operation of the clutch. Since any suitable clutch structure may be employed for the control of the rotation of the hub or sleeve 27 from the motor shaft 26 and since the clutch per se forms no part of this invention, the clutch 28 is shown schematically or indicated, and no details of construction are necessary and are not illustrated or described. Suffice it to say that the clutch mechanism 28 operatively connects or disconnects the hub or sleeve 27 to or from the motor shaft 26 and can do so by a multitude of specific means or clutch structures.

Sprockets 29 are mounted on and are fixed to or are integral with the hub or sleeve 27 and idler sprockets 30 are so arranged with respect to the tracks 14 that a sprocket chain 31 travelling over the sprockets 29 and 30 has one bight or section 31' thereof positioned or operating longitudinally between, parallel to and coextensive with the tracks 14. One or more of these continuous chains 31 and associated sprockets 29—30 (two sets being here disclosed) may be provided but a section or bight 31' of each is coextensive with and operates between the tracks 14. This portion 31' of the chain or of each chain 31 is connected by any suitable means with the extension 20 of the roller bracket plate 19 secured to the yoke 12 of the canopy 10. The rotation of the motor 25 in one direction causes the chain or chains 31 to pull the canopy 10 in a forward direction while its reverse rotation causes the chain or chains 31 to pull the canopy 10 in the opposite direction. Thus by the manipulation of switches or other standard motor controls (not shown) within the cockpit the motor 25 may be rotated in either direction to reciprocate the canopy forwardly or aftwardly as desired.

In order to provide for the manual reciprocation of the canopy 10 independently of the motor 25 and associated mechanisms, each of the forward roller bracket plates 16 is provided with an inwardly projecting, substantially horizontal ear 32. An immovable handle 33 is attached to the ear 32 of one of the roller plates 16, while a movable handle 34 is pivotally mounted under the ear 32 of the opposed roller bracket plate 16. The movable handle 34 is provided with a web 35 at its inner end which is centrally pivoted, as at 36, to and substantially flush against the under surface of the coacting ear 32. This web 35 has an arcuate slot 37, concentric to the pivot 36, operating over a pin 38 fixed to the ear 32 to limit the movement of the web 35 and the attached handle 34 about the pivot 36. Adjacent its edge and upon each side of the pivot 36, the web 35 has a roller 39 projecting below and at approximate right angles to the lower surface of the web. These rollers 39 are mounted on the web by means of pivot pins 40 secured to and passing through the web.

Manifestly when the handles 33—34 are grasped and a pull is exerted thereon in either direction the handle 34 will initially move about its pivot 36, within allowable limits, moving one or the other of the rollers 39 in a direction outwardly of the cockpit. It is proposed that this movement of either of the rollers 39 shall operate the clutch 28 to disconnect the motor 25 from the chain or chains 31 and thereby permit the movement of the canopy 10 free of unnecessary resistance. To that end an elongated bracket 41, angular in cross section, is mounted on the adjoining longeron below one of the tracks 13 by the bolts 42 or other attaching means and is substantially coextensive with the adjoining track. A slide bar 43 is mounted upon the horizontal side 44 of the bracket 41 by a series of short links 45, each pivoted to the horizontal arm 44 of the bracket 41 at one of its ends and to the slide bar 43 at the opposite end. In this manner the slide bar 43 is mounted for movement longitudinally of the elongated bracket 41 in a plane parallel to the horizontal arm 44 thereof.

The forward end 46 of the slide bar is positioned against the rollers 39 carried by the web 35 of the handle 34 and it will be noted that the short links 45 are parallel one to the other and normally slope toward the forward end of the elongated bracket 41 and therefore toward the forward end of the cockpit. Whenever the handle 34 is oscillated in either direction about its pivot 36 one or the other of the rollers 39 exerts a pressure on the extremity 46 of the slide bar 43 or on any coacting part of the edge of the latter, which pressure moves the slide bar 43 toward the vertical arm 44' of the bracket and because of the short links 45 and their angular positions also causes it to move forwardly of the elongated bracket 41 in a plane parallel to the horizontal arm 44.

It becomes evident that one edge of the slide bar 45 always contacts both, or one or the other of the rollers 39 and that under the impetus of pressure from one or the other of the rollers 39, the bar 45 can only move in one direction, viz.: forwardly of the cockpit toward the windshield 24'. This forward movement of the slide bar is transmitted to the clutch 28 to disconnect the motor 25 from the sprockets 29 prior to or substantially coincident with the initial movement of the canopy 10 relative to the fuselage in either direction.

For that purpose, adjacent the aft end of the slide bar 43 a bellcrank lever 47 is mounted, as at 47', on or adjoining the rear extremity of the horizontal arm 44 of the bracket 43, one arm of which is connected by the link 48 to the aft extremity of said slide bar 43. The opposite arm of this bellcrank 47 is connected to a transverse rod 49 which in turn, at its inner extremity, is connected to the lower extremity of the rocker arm 50 (Fig. 3). The upper extremity of this rocker arm 50 has a rotary connection 51 with the standard clutch 28. An expansion coil spring 52 is interposed between the lower extremity of the hanger 23 and the lower end of the rocker arm 50 to normally maintain a connection, through the clutch 28, between the sleeve or hub 27 of the sprockets 29 and the shaft 26 of the motor 25. Therefore the operation of the spring 52 is such that the motor is normally so connected to the sprockets 29 and to the chain or chains 31 that the rotation of the motor 25 in either direction will reciprocate the canopy as aforesaid.

However, to manually operate the canopy, a pull on the handle 34 causes the slide bar 43 to reciprocate forwardly as aforesaid to exert a pulling force on the bellcrank lever 47 which is transmitted through the rod 49 to the rocker arm 50 moving the latter against the action of the spring 52 to operate the clutch 28 to disconnect the sleeve or hub 27 from the shaft 26 of the motor 25. Thereupon a continued pull exerted on the handles 33—34 will slide the canopy 10 in either direction, depending upon the direction of the pull on the handles, without any interference of this movement by the motor. As the canopy 10 is so moved in either direction by the motor 25 the rollers 39 travel adjacent to or ride approximately against the edge of the slide bar 43, but do not exert any pressure on this bar. If, however, the canopy 10 is manually operated by and through the handles 33—34 one or the other of the rollers 39 bears directly and exerts an operating pressure on the bar 43 which is maintained while such roller presses and operates on and travels along the edge of the bar with the canopy in its movement until the handle 34 is released. When the handle 34 is released the spring 52 returns the rocker arm 50 to its normal position to thereby re-establish the normal functioning of the operating mechanism for mechanically operating the canopy from the motor and also the bar 43 is thereby returned to its inactive position. Thus if the motor is disabled, or if for any other reason it is desired to reciprocate the canopy 10 manually, all that is necessary is for the pilot to grasp the handles 33—34 and pull them in the direction of the movement he desires for the canopy, and this pull, regardless of its direction, will release the motor 25 from cooperation with the chain or chains 31 whereupon the canopy can be freely moved.

From the foregoing it is at once manifest that the means for operating the canopy mechanically is normally effective at all times but is automatically rendered ineffective upon the initiation of the manual operation of the canopy. Reversely, as soon as the manual operation of the canopy ceases the mechanical operating means is automatically restored to its normal effectiveness. Thus two means are provided for the sliding operation of the canopy, either of which is effective independently of the other, but with both so coordinated that the independent functioning of one means of operation automatically renders the other ineffective with its normal effectiveness ultimately to be automatically restored.

The motor 25, its control (not shown) and the clutch per se form no part of the present invention and any suitable standard elements may be employed in the combination for performing their several or combined functions without departing from the spirit and scope of the present invention.

What is claimed is:

1. The combination with the fuselage of an aircraft and a canopy to reciprocate relative thereto, of tracks fixed to the fuselage, rollers carried by the canopy for operation on said tracks, a motor and associated drive organized and arranged to reciprocate the canopy relative to the fuselage, manual means carried by the canopy for the reciprocation thereof relative to the fuselage entirely independent of said motor and drive, and means for rendering said motor and drive inoperative upon and during the reciprocation of the canopy by said manual means.

2. The combination with an aircraft fuselage, of a canopy, mounts for reciprocatingly securing the canopy to the fuselage, a motor and associated drive for normally reciprocating the canopy, manual means for the reciprocation of said canopy independently of said motor and drive, and means for rendering said motor and drive inoperative at the initiation of and during the reciprocation of the canopy by said manual means.

3. The combination with an aircraft fuselage, of a canopy, mounts for reciprocatingly associating the canopy with the fuselage, a motor and drive organized and arranged for normally reciprocating the canopy, means for the manual reciprocation of said canopy in complete independence of said motor and drive, and means under the control of the aforesaid means for the manual reciprocation of the canopy for automatically rendering said motor and drive ineffective upon the reciprocation of the canopy solely by said manual means.

4. The combination with the fuselage of an aircraft and a canopy, of tracks fixed to the fuselage, mounts fixed to the canopy for reciprocating cooperation with said tracks, a reversible motor, a drive interposed between said motor and said canopy whereby the operation of the motor in either direction correspondingly reciprocates the canopy on said tracks relative to the fuselage, a handle directly attached to the canopy for the manual reciprocation of the canopy in complete independence of said motor and said drive, a clutch normally operative to connect the aforesaid drive to the motor, and means associated with said handle for operating the clutch to disconnect the drive from the motor upon and during the manual reciprocation of the canopy by said handle.

5. The combination with the fuselage of an aircraft and a canopy mounted for movement relative to the fuselage, of a reversible motor, a drive interposed between said motor and the canopy whereby the operation of the motor in either direction correspondingly moves the canopy, a clutch disposed to connect and disconnect the drive to the motor, a handle movably carried by and attached to the canopy for the independent manual movement thereof, and connections carried by the fuselage and in constant operative engagement with said handle regardless of the movement and position of the canopy for controlling the operation of said clutch to disengage the drive from the motor upon the movement of the handle relative to the canopy.

6. The combination with the fuselage of an aircraft and a canopy coacting therewith, of a series of tracks fixed to the fuselage, mounts secured to the canopy and operating on the tracks to reciprocatingly support the canopy upon the fuselage, a reversible motor mounted on the fuselage adjoining the aft end of the canopy, a drive interposed between the motor and the canopy, a clutch disposed between the drive and the motor to normally connect the motor to the drive, a handle carried by and pivoted to the canopy having spaced bearing members projecting therefrom, a slide bar carried by the fuselage to be constantly engaged and operated by at least one of said projecting bearing members upon the pivotal movement of the handle in either direction preliminary to the independent reciprocation of the canopy by and through said handle, and a connection between said slide bar and said clutch whereby the operation of the slide bar as aforesaid operates the clutch to release the motor from the drive.

7. The combination with the fuselage of an aircraft and a canopy movably cooperating therewith, of a plurality of tracks fixed to the fuselage, a mounting attached to the canopy for operation upon each of said tracks, a reversible motor mounted on the fuselage, a sprocket drive connected to the canopy and coextensive with and parallel to at least one of the said tracks, a releasable clutch normally establishing driving connection between said sprocket drive and the motor, a slide bar mounted for longitudinal movement on the fuselage, a connection between said slide bar and said clutch whereby the longitudinal movement of the slide bar releases the clutch to disengage the drive and the motor, and means mounted on and carried by the canopy to move said slide bar regardless of the position of the canopy thereby to positively move it for the release of said clutch.

8. The combination with the fuselage of an aircraft and a canopy movably cooperating therewith, of a plurality of tracks fixed to the fuselage, a mounting carried by and fixed to the canopy for operation upon each of said tracks, a reversible motor mounted on the fuselage, a drive connected to the canopy, a releasable clutch normally establishing operative connection between the drive and the motor, a slide bar mounted for movement on the fuselage, a connection between said slide bar and said clutch whereby the slide bar by its movement releases the clutch and disengages the drive from the motor, a handle pivotally mounted on and carried by the canopy adjacent said slide bar, and rollers so carried by the handle that at least one thereof will engage and move the slide bar upon the pivotal movement of the handle in either direction for the independent manual movement of the canopy.

9. The combination with the fuselage of an aircraft and a canopy coacting therewith, of a plurality of tracks fixed to the fuselage, a mounting attached to the canopy individual to and for operation upon each of said tracks, a reversible motor mounted on the fuselage, a sprocket drive having a portion thereof resting parallel to and coextensive with at least one of the tracks aforesaid and having that portion attached to the canopy, a releasable clutch normally engaging the sprocket drive to the motor, a reciprocating rod operatively connected to the clutch for the release thereof to disengage the motor from the drive, a bell crank lever mounted on the fuselage and connected to said rod whereby the oscillation of the lever moves the rod to release said clutch, a slide bar carried by the fuselage for movement forwardly thereof and coextensive with the path of movement of the forward end of the fuselage, a handle pivotally mounted on the forward extremity of the fuselage, rollers projecting from the handle upon the opposite sides of its pivot and overlying the slide bar whereby the pivotal movement of the handle in either direction brings one or the other of the rollers in operative contact with said slide bar to move it forwardly of the fuselage, and a connection between said slide bar and said bellcrank lever.

10. The combination with the fuselage of an aircraft and a canopy coacting therewith, of a track fixed to the fuselage on each side of the cockpit, a track fixed to the fuselage aft of the cockpit, a mount secured to the canopy individual to and operating upon each of the said tracks, a reversible motor mounted on the fuselage, a flexible drive centrally secured to the canopy and part of which lies parallel to and coextensive with the track aft of the cockpit, a clutch including means for operatively connecting the flexible drive to the motor and a grooved collar for the operation of the clutch, a rocker arm connected to the collar of the clutch for the operation thereof, a spring acting on said rocker arm to normally establish connection through the clutch between the motor and the drive aforesaid, a movable rod attached at one of its ends to said rocker arm to move it against the spring aforesaid, a bellcrank lever mounted on the fuselage and having one of its arms connected to the other end of said rod, a slide bar connected to the other of the arms of said bellcrank, short links pivoted to the fuselage and sloping forwardly thereof and connected at their outer extremities to the slide bar aforesaid, said bar being substantially coextensive with the path of movement of the forward end of the canopy, a handle pivoted to the forward end of one side of the canopy, and rollers projecting from said handle, one upon each side of its pivot, to overlie and operate against the edge of said bar, whereby the pivotal movement of the handle in either direction causes one or the other of said rollers to contact and exert a pressure on said bar to move it forwardly of the fuselage.

11. The combination with the fuselage of an aircraft and a canopy coacting therewith, of a track fixed to the fuselage on each side of the cockpit, a track fixed to the fuselage aft of the cockpit, a mount secured to the fuselage individual to and operating upon each of the said tracks, a reversible motor mounted on the fuselage, a flexible drive centrally secured to the canopy having a portion of its length parallel to and coextensive with the track aft of the cockpit, a clutch including means for connecting the flexible drive to the motor and a grooved collar for the operation of the clutch, a rocker arm operatively connected to the collar of the clutch for the release thereof, a spring acting on said rocker arm to normally establish connection, through the clutch, between the motor and the drive aforesaid, a movable rod attached at one of its ends to said rocker arm to move it against the spring aforesaid for the release of the clutch, a bellcrank lever mounted on the fuselage and having one of its arms connected to the other end of said rod, a bar connected to the other arm of said bellcrank, short links pivoted to the fuselage and sloping forwardly thereof and connected at their outer extremities to the bar aforesaid, said bar being substantially coextensive with the path of movement of the forward end of the canopy, a handle terminating in a web pivoted centrally of said web to the forward end of one side of the canopy and a roller carried by and projecting from said web on each side of said canopy, both of said rollers overlying and traveling upon the adjacent edge of the bar, whereby a pivotal movement of the handle in either direction causes one or the other of said rollers to exert a pressure on the slide bar to move it forwardly of the fuselage.

12. The combination with the fuselage of an aircraft and a canopy, of a plurality of tracks fixed to the fuselage, one at each side of the cockpit and one extending aftward from the cockpit, a mount attached to the canopy individual to and for cooperation with each of said tracks, a reversible motor mounted on the fuselage, a chain drive coacting with said motor and having a portion thereof coextensive with the track aft of the cockpit, and a connection between the canopy and said chain drive.

13. The combination with an aircraft fuselage, of a canopy having a transverse yoke affixed thereto, a plurality of tracks secured to the fuselage, one at each side of the cockpit and one extending aftward from the cockpit, the forward end of each of said tracks sloping downwardly and forwardly, a mounting affixed to the canopy individual to and operating upon each of said tracks, and means coacting with the yoke aforesaid to move the canopy relative to the tracks in either direction.

14. The combination with an aircraft fuselage, of a canopy, a transverse yoke affixed to said canopy intermediate of its ends, a plurality of tracks secured to the fuselage, one at each side of the cockpit and one extending aftward from the cockpit, the forward end of each of said tracks sloping downwardly and forwardly, a mounting affixed to the canopy individual to and operating upon each of said tracks, a reversible motor mounted on the fuselage, a chain drive, idler sprockets at the ends of the track aft of the cockpit, a drive sprocket coacting with the motor, said chain operating over said sprockets thereby causing a portion of its length to travel parallel to and coextensive with the track aft of the cockpit, and a connection between the yoke aforesaid and the chain.

15. The combination with the fuselage of an aircraft, of a canopy having a transverse yoke attached thereto intermediate of its ends, a plurality of tracks secured to the fuselage one upon each side of the cockpit and one positioned centrally aft of the cockpit, a roller bracket secured to the forward end of each side of the canopy and operative on the corresponding track secured at the side of the cockpit, a roller bracket centrally secured to the yoke aforesaid and cooperating with the central track aft of the cockpit, an idler sprocket adjoining each end of said track aft of the cockpit, a reversible motor, a sprocket chain driven by said motor and operating over the idler sprockets whereby a portion of the chain travels parallel to and coextensive with said track aft of the cockpit, and a permanent connection between said sprocket chain and the roller bearing bracket centrally secured to said yoke.

16. The combination with the fuselage of an aircraft, of a canopy having a transverse yoke attached thereto intermediate of its ends, a plurality of track secured to the fuselage, one upon each side of the cockpit and one centrally positioned aft of the cockpit, the forward end portions of each of said tracks sloping downwardly in a forward direction and the remainder of each of said tracks sloping downwardly in an aftward direction, and roller brackets secured to the forward extremity of each side of the canopy and centrally to the yoke aforesaid for operation on the correspondingly adjoining tracks.

CARL C. KING.

REFERENCES CITED

The following references are of record in the file of this patent:

UNITED STATES PATENTS

| Number | Name | Date |
|---|---|---|
| 1,878,943 | Locke et al. | Sept. 20, 1932 |
| 2,125,752 | Saulnier | Aug. 2, 1938 |
| 2,295,345 | Jerman | Sept. 8, 1942 |
| 2,332,158 | Magill et al. | Oct. 19, 1943 |

FOREIGN PATENTS

| Number | Country | Date |
|---|---|---|
| 83,407 | Austria | Dec. 8, 1930 |
| 278,862 | Great Britain | Oct. 20, 1927 |
| 699,119 | France | Dec. 8, 1930 |